(12) United States Patent
Hashimoto et al.

(10) Patent No.: US 11,673,279 B2
(45) Date of Patent: Jun. 13, 2023

(54) ISOLATOR SYSTEM

(71) Applicant: KAWASAKI JUKOGYO KABUSHIKI KAISHA, Kobe (JP)

(72) Inventors: Yasuhiko Hashimoto, Kobe (JP); Kazunori Hirata, Yao (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 542 days.

(21) Appl. No.: 16/325,000

(22) PCT Filed: Aug. 7, 2017

(86) PCT No.: PCT/JP2017/028562
§ 371 (c)(1),
(2) Date: Feb. 12, 2019

(87) PCT Pub. No.: WO2018/030331
PCT Pub. Date: Feb. 15, 2018

(65) Prior Publication Data
US 2019/0224859 A1 Jul. 25, 2019

(30) Foreign Application Priority Data

Aug. 12, 2016 (JP) .............................. JP2016-158561

(51) Int. Cl.
*B25J 21/02* (2006.01)
*B25J 19/00* (2006.01)
*B01L 1/02* (2006.01)

(52) U.S. Cl.
CPC ................. *B25J 21/02* (2013.01); *B01L 1/02* (2013.01); *B25J 19/0083* (2013.01)

(58) Field of Classification Search
CPC ... B25J 15/00; B25J 21/00; B25J 19/00; B25J 17/00; B25J 21/02; B25J 19/0083; B25J 18/025; B01L 1/02
See application file for complete search history.

(56) References Cited

U.S. PATENT DOCUMENTS 2,320,967 A * 6/1943 Dunkelberger ............ B25J 1/04
81/125
3,952,979 A * 4/1976 Hansen ................... F16F 15/02
248/550

(Continued)

FOREIGN PATENT DOCUMENTS

DE 10311107 A1 9/2004
JP H10-29084 A 2/1998

(Continued)

OTHER PUBLICATIONS

Crowder. "An anthropomorphic robotic end effector." Robotics and Autonomous Systems, Nov. 7, 1991, No. 4, pp. 253-268.

*Primary Examiner* — Elizabeth A Robinson
*Assistant Examiner* — Tingchen Shi
(74) *Attorney, Agent, or Firm* — Oliff PLC

(57) ABSTRACT

A workspace isolated from an exterior space by a partition, a glove provided to the partition so that an external surface thereof is exposed to the workspace and an internal surface thereof communicates with the exterior space, and a robot configured to insert an arm into the glove and perform a work in the workspace. The glove includes, at a tip-end part thereof, an operating part provided inside the glove, and a hand part provided so as to be exposed to the workspace.

8 Claims, 15 Drawing Sheets

(56) References Cited

U.S. PATENT DOCUMENTS

| | | | | |
|---|---|---|---|---|
| 5,410,944 | A | * | 5/1995 | Cushman .............. B25J 9/14 74/490.05 |
| 5,451,134 | A | * | 9/1995 | Bryfogle .............. B64F 1/322 414/680 |
| 5,897,800 | A | | 4/1999 | Sawai et al. |
| 2002/0159868 | A1 | * | 10/2002 | Nadicksbernd .......... B24C 3/04 414/292 |
| 2009/0298129 | A1 | | 12/2009 | Spence et al. |
| 2015/0224506 | A1 | * | 8/2015 | Spence .............. B01L 3/0293 422/561 |
| 2016/0228329 | A1 | * | 8/2016 | Murakami .............. A61J 1/16 |

FOREIGN PATENT DOCUMENTS

| | | | |
|---|---|---|---|
| JP | 2000-343479 A | 12/2000 | |
| JP | 2010-563 A | 1/2010 | |
| JP | 2010-184303 A | 8/2010 | |
| JP | 2016-59996 A | 4/2016 | |
| JP | 2016-117003 A | 6/2016 | |
| WO | WO-8501496 A1 * | 4/1985 | ......... B25J 19/0083 |

\* cited by examiner

ISOLATOR SYSTEM

TECHNICAL FIELD

The present disclosure relates to an isolator system.

BACKGROUND ART

An isolator is a device which makes an internal space thereof into a germfree condition in order to perform a work, such as cell culture etc. Among such isolators, it is known that an isolator with a robot is disposed in the internal space maintained at the germfree condition (e.g., see Patent Document 1).

In the isolator disclosed in Patent Document 1, the robot disposed in a workroom (internal space) grips and conveys a cultivation container, such as a dish.

REFERENCE DOCUMENT OF CONVENTIONAL ART

Patent Document

[Patent Document 1] JP2016-117003A

DESCRIPTION OF THE DISCLOSURE

Problems to be Solved by the Disclosure

Meanwhile, in the isolator disclosed in Patent Document 1, since the robot is disposed in the workroom, maintenance work may become difficult for a breakage of the robot, or the maintenance work may take too much time.

The present disclosure is made in view of addressing the above problems, and one purpose thereof is to provide an isolator system which enables an easy maintenance of a robot which performs a work in an internal space of the isolator.

SUMMARY OF THE DISCLOSURE

In order to solve the above problems an isolator system according to one aspect of the present disclosure includes a workspace isolated from an exterior space by a partition, a glove provided to the partition so that an external surface thereof is exposed to the workspace and an internal surface thereof communicates with the exterior space, and a robot configured to insert an arm into the glove and perform a work in the workspace. The glove includes, at a tip-end part thereof, an operating part provided inside the glove, and a hand part provided so as to be exposed to the workspace.

Thus, since the robot can be disposed in the exterior space outside the workspace, the robot can easily be maintained. Moreover, by disposing the robot outside the workspace, since the robot is not exposed to the hydrogen peroxide gas for sterilizing the inside of the workspace, or the acid gas for turning the atmosphere inside the workspace into acidic, the robot can be prevented from corrosion.

Further, an isolator system according to another aspect of the present disclosure includes a workspace isolated from an exterior space by a partition, a glove provided to the partition so that an external surface thereof is exposed to the workspace and an internal surface thereof communicates with the exterior space, and a robot configured to insert an arm into the glove and perform a work, in the workspace. A tip-end part of the glove is formed so as to conform to the shape of the tip-end part of the arm of the robot.

Thus, since the robot can be disposed in the exterior space outside the workspace, the robot can easily be maintained. Moreover, by disposing the robot outside the workspace, since the robot is not exposed to the hydrogen peroxide gas for sterilizing the inside of the workspace, or the acid gas for turning the atmosphere inside the workspace into acidic, the robot can be prevented from corrosion.

Effects of the Disclosure

According to the isolator system of the present disclosure, since the robot can be disposed in the exterior space outside the workspace, the robot can easily be maintained. Moreover, by disposing the robot outside the workspace, since the robot is not exposed to the hydrogen peroxide gas for sterilizing the inside of the workspace, or the acid gas for turning the atmosphere inside the workspace into acidic, the robot can be prevented from corrosion.

MODES FOR CARRYING OUT THE DISCLOSURE

Figure 1:
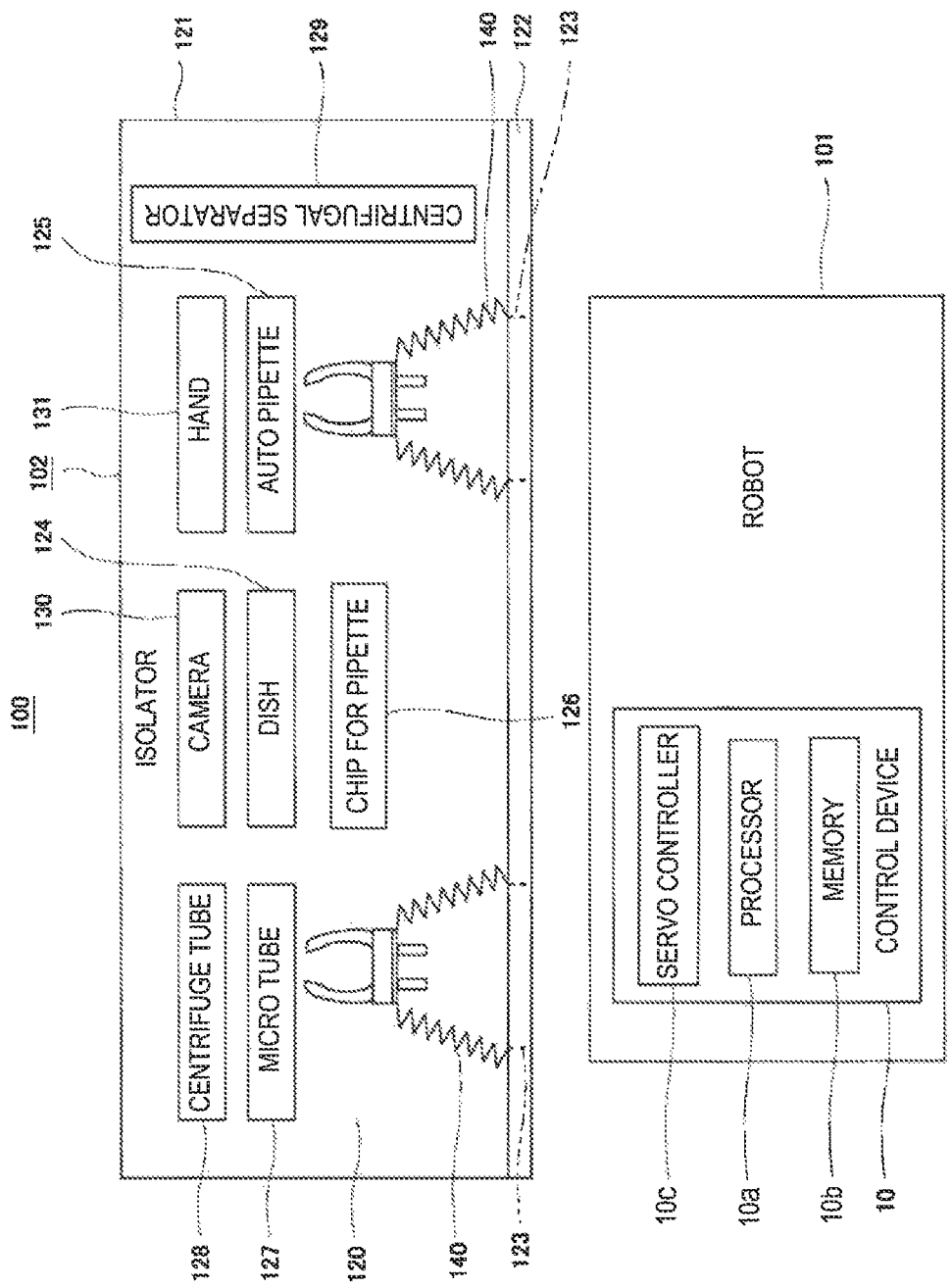
FIG. 1 is a block diagram schematically illustrating a structure of an isolator system according to Embodiment 1.

Hereinafter, embodiments of the present disclosure will be described with reference to the drawings. Note that, throughout the drawings, the same or corresponding parts are denoted with the same reference characters to omit redundant description. In addition, in all the drawings, components for describing the present disclosure are extracted and illustrated, and illustration of other components may be omitted. Further, the present disclosure is not limited to the following embodiments.

Embodiment 1

An isolator system according to Embodiment 1 includes a workspace which is isolated from the exterior space by a partition, and a pair of gloves provided to the partition so that external surfaces thereof are exposed to the workspace and internal surfaces thereof communicate with the exterior space, and a robot which inserts arms into the gloves and performs a work inside the workspace. At a tip-end part of each glove, an operating part provided inside the glove, and a hand part provided so as to be exposed to the workspace, are formed.

In the isolator system according to Embodiment 1, the gloves may be configured so that a tip-end part thereof is positioned at a given position when a base-end part contracts.

Further, in the isolator system according to Embodiment 1, the base-end part of the gloves may be formed in a bellows shape so as to be extendable and contractable.

Further, the isolator system according to Embodiment 1 may further be provided with a hand which is disposed in the workspace of the isolator and holds a workpiece.

Below, one example of the isolator system according to Embodiment 1 is described with reference to FIGS. 1 to 7.

[Configuration of Isolator System]

Figure 2:
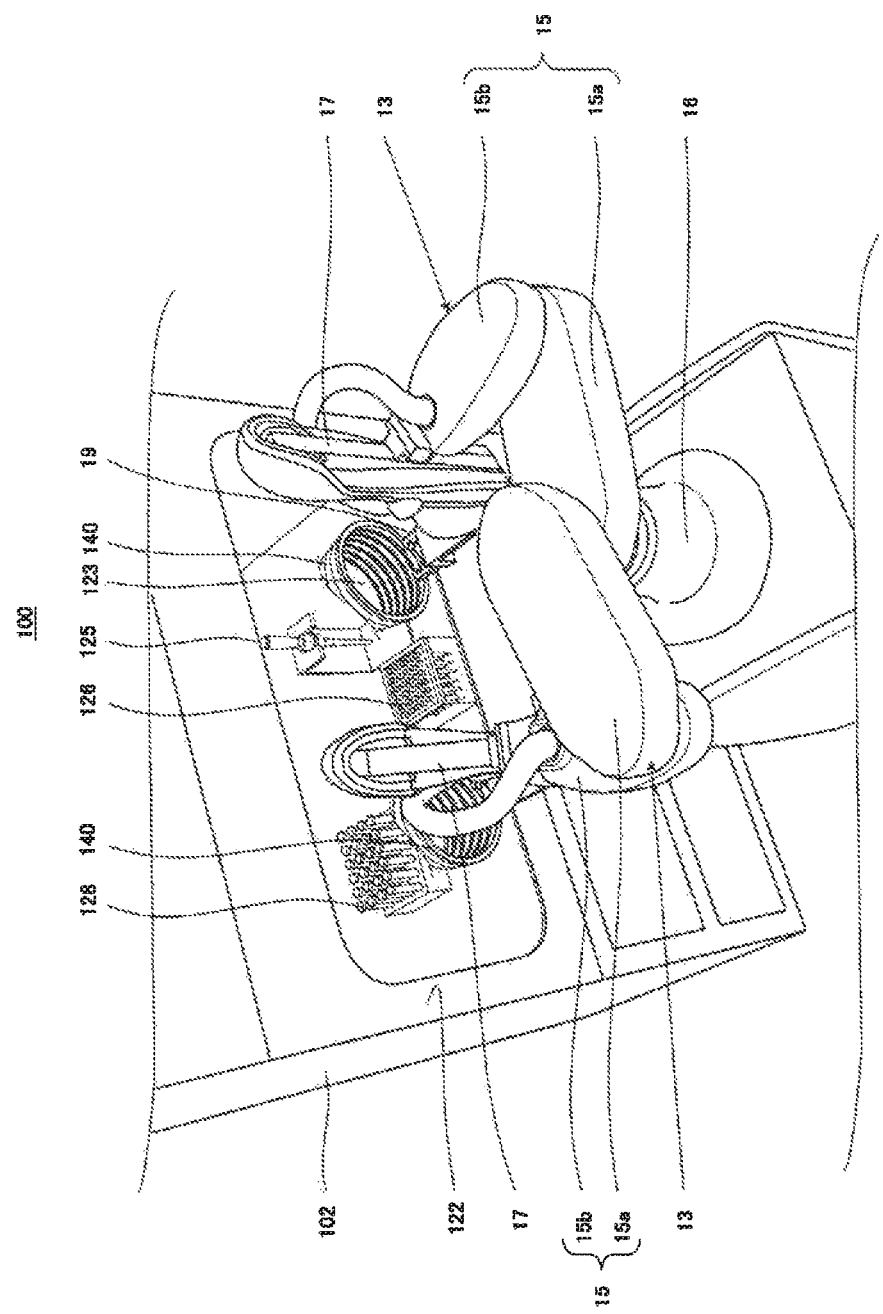
FIG. 2 is a perspective view of the isolator system illustrated in FIG. 1.
Figure 3:
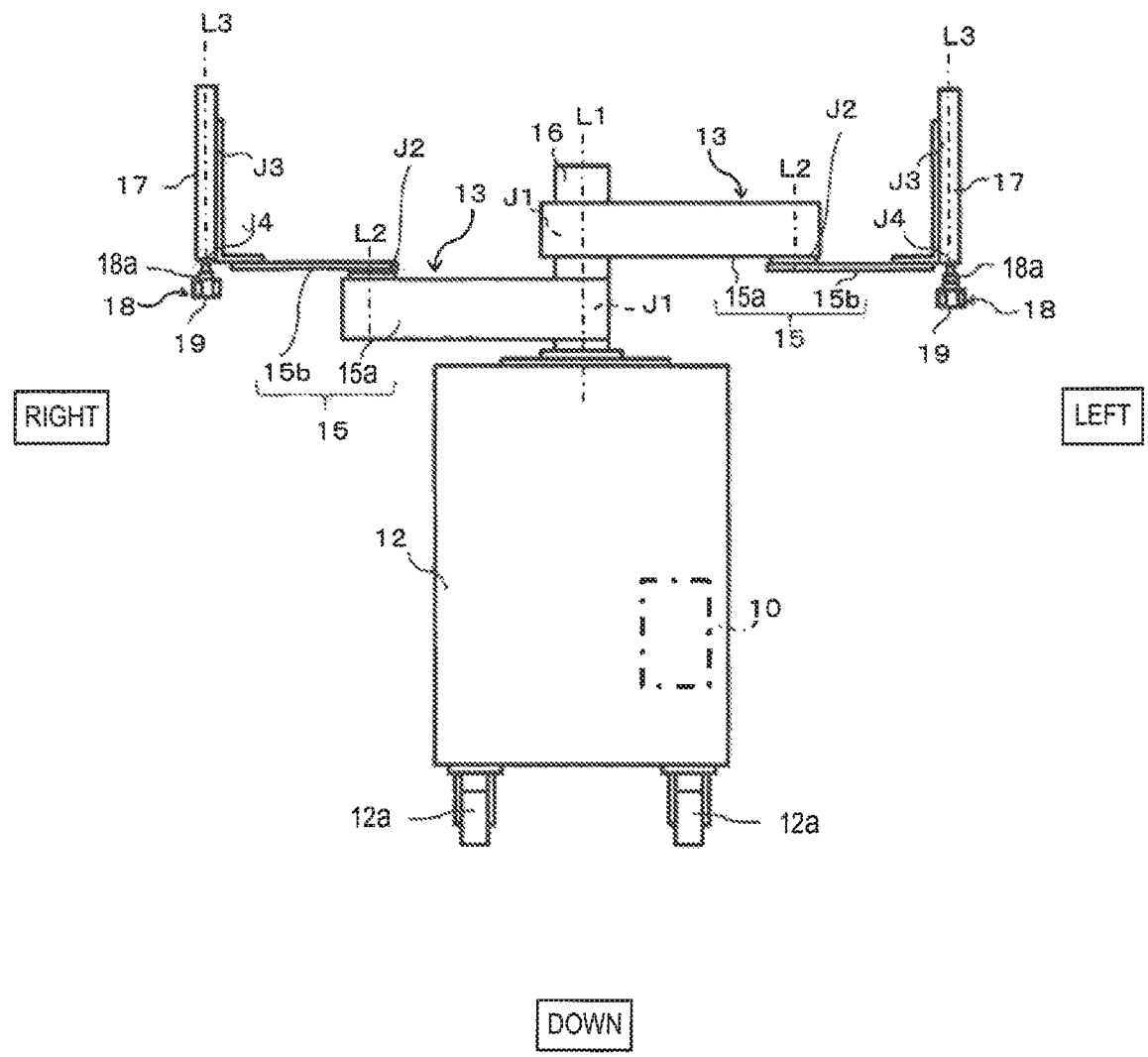
FIG. 3 is a schematic diagram schematically illustrating a structure of a robot in the isolator system illustrated in FIG. 1.

FIG. 1 is a block diagram schematically illustrating a structure of the isolator system according to Embodiment 1. FIG. 2 is a perspective view of the isolator system illustrated in FIG. 1. FIG. 3 is a schematic diagram schematically illustrating a structure of the robot in the isolator system illustrated in FIG. 1. Note that, in FIG. 3, up-and-down directions and left-and-right directions of the robot are expressed as up-and-down directions and left-and-right directions of the figure.

As illustrated in FIGS. 1 and 2, the isolator system 100 according to Embodiment 1 includes a robot 101, and an isolator 102 formed with a workspace 120 therein. The robot 101 disposed outside the workspace 120 is configured to perform in the workspace 120 a series of works comprised of a plurality of processes.

Note that the series of works comprised of the plurality of processes includes works, such as holding, conveying of a cultivation container such as a dish 124, pouring liquid such as culture solution into the dish 124 by using an auto pipette 125.

Although in Embodiment 1 a form in which the robot 101 is, but not limited to be, a horizontal articulated robot is illustrated, the robot 101 may be a vertical articulated robot.

Further, although in Embodiment 1 a form in which the isolator system 100 is, but not limited to be, provided with the robot 101 is adopted, other forms without being provided with the robot 101 may also be adopted.

First, the structure of the robot 101 is described in detail with reference to FIGS. 1 to 3.

As illustrated in FIGS. 1 to 3, the robot 101 includes a carriage 12, a base shaft 16, a pair of robot arms (hereinafter, may simply be referred to as "the arms") 13, and a control device 10. In the robot 101, the control device 10 executes an automatic operation of the robot 101 when an operator teaches a necessary matter to the control device 10 by using an appropriate device.

The carriage 12 has wheels 12a so that it is movable. The base shaft 16 is fixed to an upper surface of the carriage 12. The arms 13 are provided to the base shaft 16 so as to be rotatable on a rotation axis L1 which passes through the axial center of the base shaft 16. Specifically, the arms 13 are provided so that one arm 13 and the other arm 13 have a height difference. Further, the control device 10 is accommodated in the carriage 12.

Note that although in Embodiment 1 a form in which the left arm 13 and the right arm 13 have, but not limited to have, similar structures is illustrated, the arms 13 may have different structures. The left arm 13 and the right arm 13 are configured to operate independently and to operate in a mutually associated manner.

Each arm 13 includes an arm part 15, a wrist part 17, and a hand part 18. In Embodiment 1, the arm part 15 is comprised of a first link 15a and a second link 15b which are substantially rectangular parallelepiped. The first link 15a is provided with a rotary joint J1 at a base-end part, and a rotary joint J2 at a tip-end part. The second link 15b is provided with a linear-motion joint J3 at a tip-end part.

The first link 15a is coupled via the rotary joint J1 to the base shaft 16 at a base-end part so that it is rotatable on the rotation axis L1 by the rotary joint J1. The second link 15b is coupled via the rotary joint J2 to the tip-end part of the first link 15a at the base-end part so that it is rotatable on the rotation axis L2 by the rotary joint J2.

The wrist part 17 is coupled via the linear-motion joint J3 to the tip-end part of the second link 15b so that it is vertically movable with respect to the second link 15b. A rotary joint J4 is provided to a lower end part of the wrist part 17. The hand part 18 is coupled via the rotary joint J4 to a lower end part of the wrist part 17 so that it is rotatable on the rotation axis L3 by the rotary joint J4.

The hand part 18 is comprised of an attachment part 18a and a grip part 19, and the grip part 19 is provided to a tip end of the arm 13. The attachment part 18a is detachable from the wrist part 17 via the rotary joint J4. The grip part 19 grips an operating part 43 provided to a tip-end part of a glove 140 which will be described later.

Drive motors (not illustrated) as one example of actuators which relatively rotate or elevate two members which are coupled by each joint are provided to the respective joints J1-J4 of the arm 13. Each drive motor may be a servo motor which is servo-controlled by the control device 10, for example. Moreover, rotation sensors (not illustrated) which detect rotational positions of the drive motors, and current sensors (not illustrated) which detect current for controlling the rotation of the drive motors, are provided to the respective joints J1-J4, respectively. Each rotation sensor may be an encoder, for example.

As illustrated in FIG. 1, the control device 10 includes a processor 10a, such as a CPU, a memory 10b, such as a ROM and/or a RAM, and a servo controller 10c. The control device 10 is a robot controller provided with a computer, such as a microcontroller, for example.

Note that the control device 10 may be comprised of a single control device 10 which carries out a centralized control, or may be comprised of a plurality of control devices 10 which collaboratively carries out a distributed control. Although in Embodiment 1 a form in which the memory 10b is, but not limited to be, disposed in the control device 10 is adopted, the memory 10b may be provided separately from the control device 10.

The memory 10b stores information on a basic program as the robot controller, various fixed data, etc. The processor 10a controls various operation of the robot 101 by reading and executing software, such as the basic program, stored in the memory 10b. That is, the processor 10a generates a control command for the robot 101, and outputs the command to the servo controller 10c. The servo controller 10c controls the drive of the servo motors corresponding to the joints J1-J4 of each arm 13 of the robot 101 based on the control commands generated by the processor 10a.

Note that the structure of the robot 101 described above is one example without being limited and, thus, the structure may suitably be changed according to the type of work which is carried out using the robot 101, the workspace, etc.

Next, the structure of the isolator 102 is described in detail with reference to FIGS. 1 and 2.

As illustrated in FIGS. 1 and 2, the isolator 102 is provided with a case 121, and an internal space of the case 121 constitutes the workspace 120. Moreover, the isolator 102 is also provided with devices (not illustrated) with which known isolators are provided, such as a gas supply device which supplies hydrogen peroxide gas etc. for sterilizing the workspace 120, and a fan for maintaining the inside of the workspace 120 at a positive pressure.

In the workspace 120 of the case 121, instruments with which the robot 101 performs the series of works are disposed. The instruments include the dish 124, the auto pipette 125, and a chip 126 which is used for the auto pipette 125, a micro tube 127, a centrifuge tube 128, and a centrifugal-separator 129, for example.

Moreover, a camera 130 may be disposed in the workspace 120 of the case 121, and an image imaged by the camera 130 may be outputted to the control device 10 of the robot 101. Note that the control device 10 may calculate positional information of each instrument based on the image information outputted from the camera 130, or may calculate the positional information of each instrument based on image information from a camera (not illustrated) attached to the robot 101.

Further, a hand 131 having the same or different structure as/from the hand part 42 provided to the tip-end part of the glove 140 described later may be disposed in the workspace 120. For example, the hand 131 may be structured so that the grip part is formed in a fan shape having a large radius in order to hold the dish 124, or may have the function of the auto pipette 125, or the grip part is formed in a fan shape having a small radius in order to hold the micro tube 127 or the centrifuge tube 128.

An openable and closable door 122 (partition) for carrying in each instrument into the workspace 120 is provided in a side surface of the case 121. The door 122 can seal the workspace 120 with an appropriate element (e.g., an O-ring) when it is closed. Two through-holes 123 are formed at appropriate locations of the door 122, and the gloves 140 are provided so as to cover the through-holes 123. The gloves 140 are disposed so that the airtightness of the workspace 120 is maintained by appropriate elements (e.g., O-rings etc.).

Here, the structure of the glove 140 is described in detail with reference to FIGS. 4 and 5.

Figure 4:
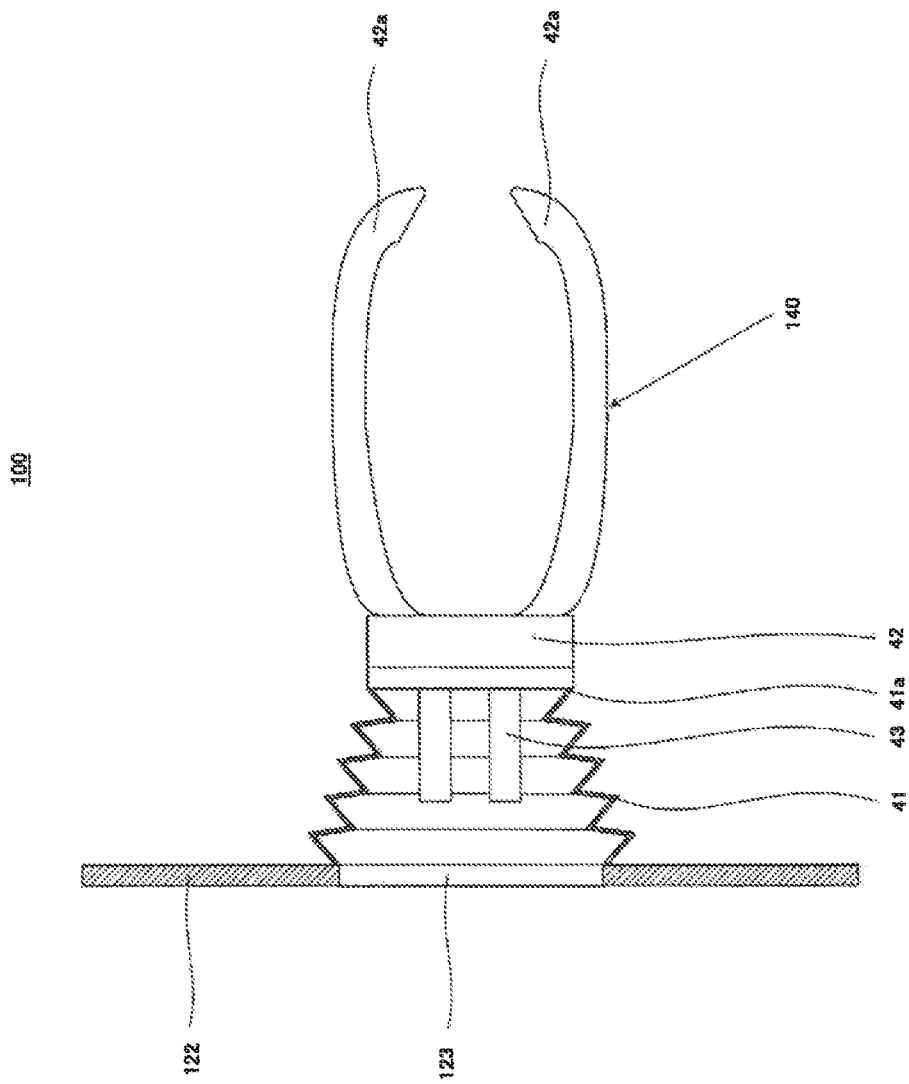
FIG. 4 is an enlarged cross-sectional view illustrating a substantial part of the isolator system illustrated in FIGS. 1 and 2.
Figure 5:
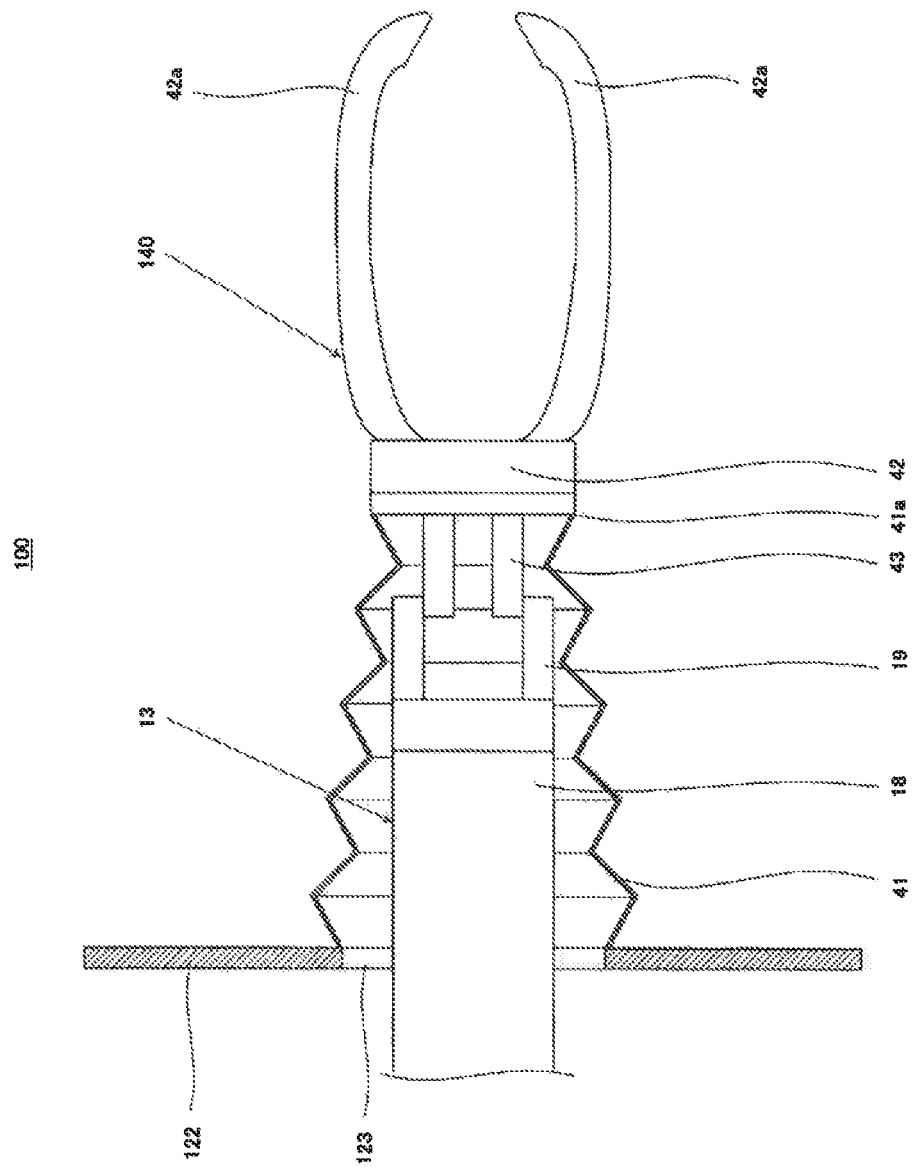
FIG. 5 is an enlarged cross-sectional view illustrating the substantial part of the isolator system illustrated in FIGS. 1 and 2.

FIGS. 4 and 5 are enlarged cross-sectional views illustrating a substantial part of the isolator system illustrated in FIGS. 1 and 2, where FIG. 4 illustrates a state before the arm of the robot is inserted into the glove, and FIG. 5 illustrates a state after the arm of the robot is inserted into the glove.

As illustrated in FIGS. 4 and 5, the glove 140 is provided so that the external surface is exposed to the workspace 120 and the internal surface is exposed to outside air. The glove 140 is formed in a bellows shape at a base-end part 41. Thus, the glove 140 is freely movable so as to advance and retreat (extend and contract), and can be bent or curved.

The length of the base-end part 41 in the extending and contracting directions (front-and-rear directions of the robot 101) is suitably adjusted so that a tip-end part of the glove 140 can reach each instrument disposed inside the workspace 120 when the base-end part 41 extends.

Note that the base-end part 41 may be made of any kind of material, which enables the airtightness of the workspace 120, and the advancing and retreating (extending and contracting), and the bending or curving, and may be made of, for example, PVC (polyvinyl chloride), PTFE (polytetrafluoroethylene), or PFA (tetrafluoroethylene-perfluoroalkyl vinyl ether copolymer).

The hand part 42 which holds the workpiece, such as the dish 124, is provided to the tip-end part of the glove 140 (precisely, the tip end 41a of the base-end part 41). The hand part 42 is disposed so as to be exposed to the workspace 120, and is attached to a tip end 41a of the base-end part 41 via an appropriate element (e.g., an O-ring) so that the airtightness of the workspace 120 is maintained. Note that a support member which supports the hand part 42 of the glove 140 may be disposed in the workspace 120.

Pawl parts 42a for gripping the workpiece are provided to the hand part 42, and, an inside surface of each pawl part 42a is formed in an arc shape. Thus, the hand part 42 can easily grip the disk-shaped dish 124 or the cylindrical auto pipette 125.

Note that although in Embodiment 1 the form n which the inside surface of the pawl part 42a is formed in the arc shape is adopted, the present disclosure is not limited to this structure. For example, the inside surface of the pawl part 42a may adopt a flat plate shape. In this case, an elastic member is disposed on the inside surface of the pawl part 42a to increase the contacting area with the workpiece, such as the dish 124.

Moreover, the operating part 43 is provided to the tip-end part of the glove 140 so as to be located in an internal space of the glove 140 (base-end part 41). The operating part 43 is configured so as to operate the pawl parts 42a of the hand part 42 by the grip part 19 of the arm 13 of the robot 101 gripping the operating part 43. Note that the operating part 43 may physically operate the pawl parts 42a, or may operate the pawl parts 42a by being electrically connecting with the grip part 19.

[Operation and Effects of Isolator System]

Next, operation and effects of the isolator system 100 according to Embodiment 1 are described with reference to FIGS. 1 to 7. Note that, since the operation of the robot 101 when the robot 101 performs the series of works comprised of the plurality of processes is performed similarly to the known robots, the detailed description of the operation is omitted. The following operation is executed by the processor 10a of the control device 10 reading the program stored in the memory 10b.

First, a sterilization operation performed by the robot 101 before executing the series of works comprised of the plurality of processes is described with reference to FIGS. 1 to 6.

Figure 6:
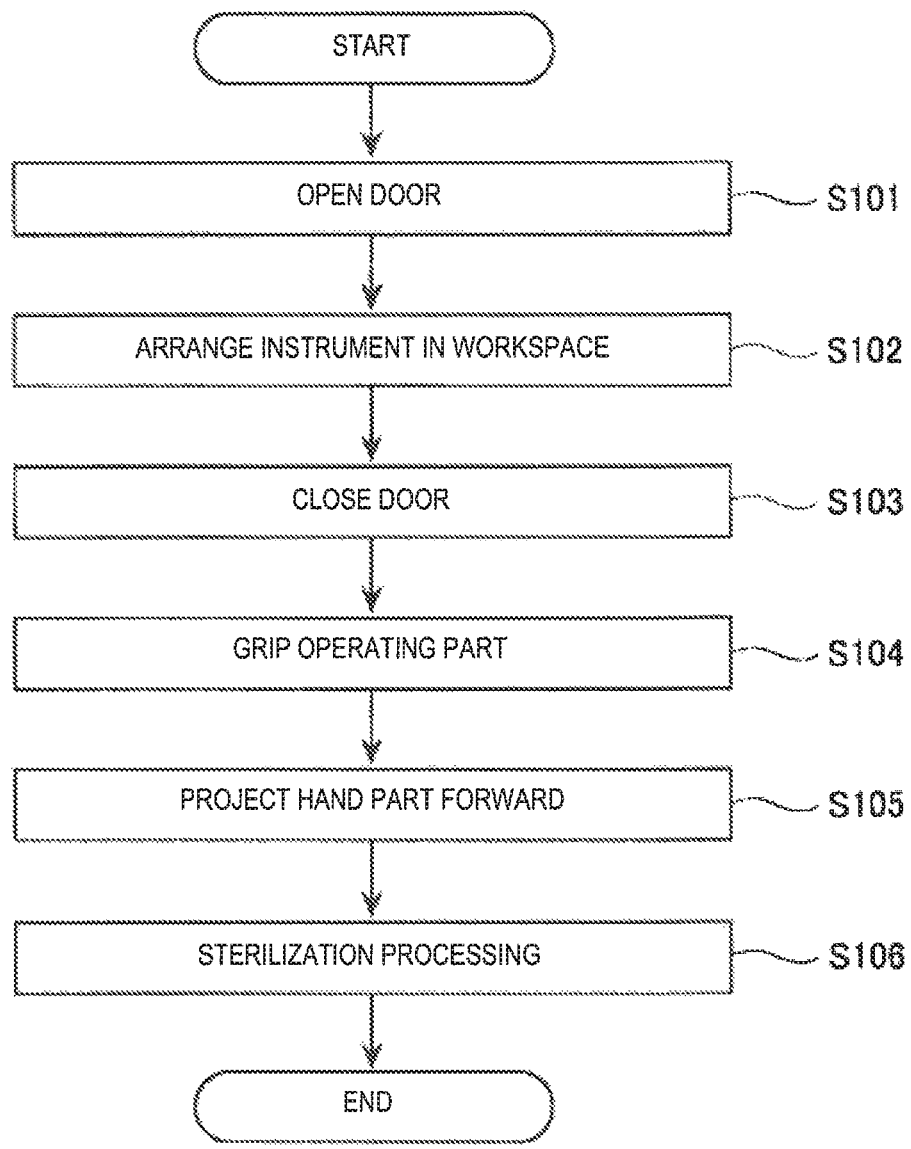
FIG. 6 is a flowchart illustrating one example of a sterilization operation performed before executing a series of works in the isolator system according to Embodiment 1.

FIG. 6 is a flowchart illustrating one example of the sterilization operation performed before executing the series of works in the isolator system according to Embodiment 1.

As illustrated in FIG. 6, when an instructive information indicative of executing the series of works is inputted by the operator through an input device (not illustrated), the control device 10 causes the robot 101 to move in front of the door 122 of the isolator 102, and to operate the arm 13 to open the door 122 (Step S101). Next, the control device 10 operates the arm 13 to arrange the instrument (e.g., the dish 124) to be used for the series of works at an appropriate location in the workspace 120 (Step S102).

Next, the control device 10 operates the arm 13 to close the door 122 (Step S103). Next, the control device 10 operates the arm 13 located outside the workspace 120 to cause the hand part 18 to enter into the internal space of the base-end part 41 of the glove 140 from the through-hole 123 of the door 122, and to cause the grip part 19 to grip the operating part 43 of the glove 140 (Step S104). Here, suppose that the base-end part 41 of the glove 140 is in the contracted state (hereinafter, the position of the glove 140 in the contracted state is referred to as "the initial position"), as illustrated in FIG. 4.

Next, the control device 10 operates the arm 13 to project the hand part 18 located in the internal space of the base-end part 41 forward (toward the inside of the workspace 120) (Step S105). Thus, as illustrated in FIG. 5, the base-end part 41 of the glove 140 is in the extended state.

Next, the control device 10 performs the sterilization processing (Step S106). For example, sterilizing gas, such as hydrogen peroxide gas, may be supplied into the workspace 120 from a gas supply device (not illustrated) to execute the sterilization processing of the inside of the workspace 120, and the instruments. Moreover, for example, the sterilization processing may be executed by spraying 70 to 80% ethanol water solution, Oxydol® (hydrogen peroxide solution), sodium hypochlorite water solution, etc. onto the internal walls of the case 121 and the door 122, the instruments such as the dish 124, and the surface of the glove 140.

Then, after the sterilization processing is executed, the control device 10 ends this program, and executes the series of works.

Next, a sterilization operation performed after the robot 101 executed the series of works comprised of the plurality of processes is described with reference to FIGS. 1 to 5, and 7.

Figure 7:
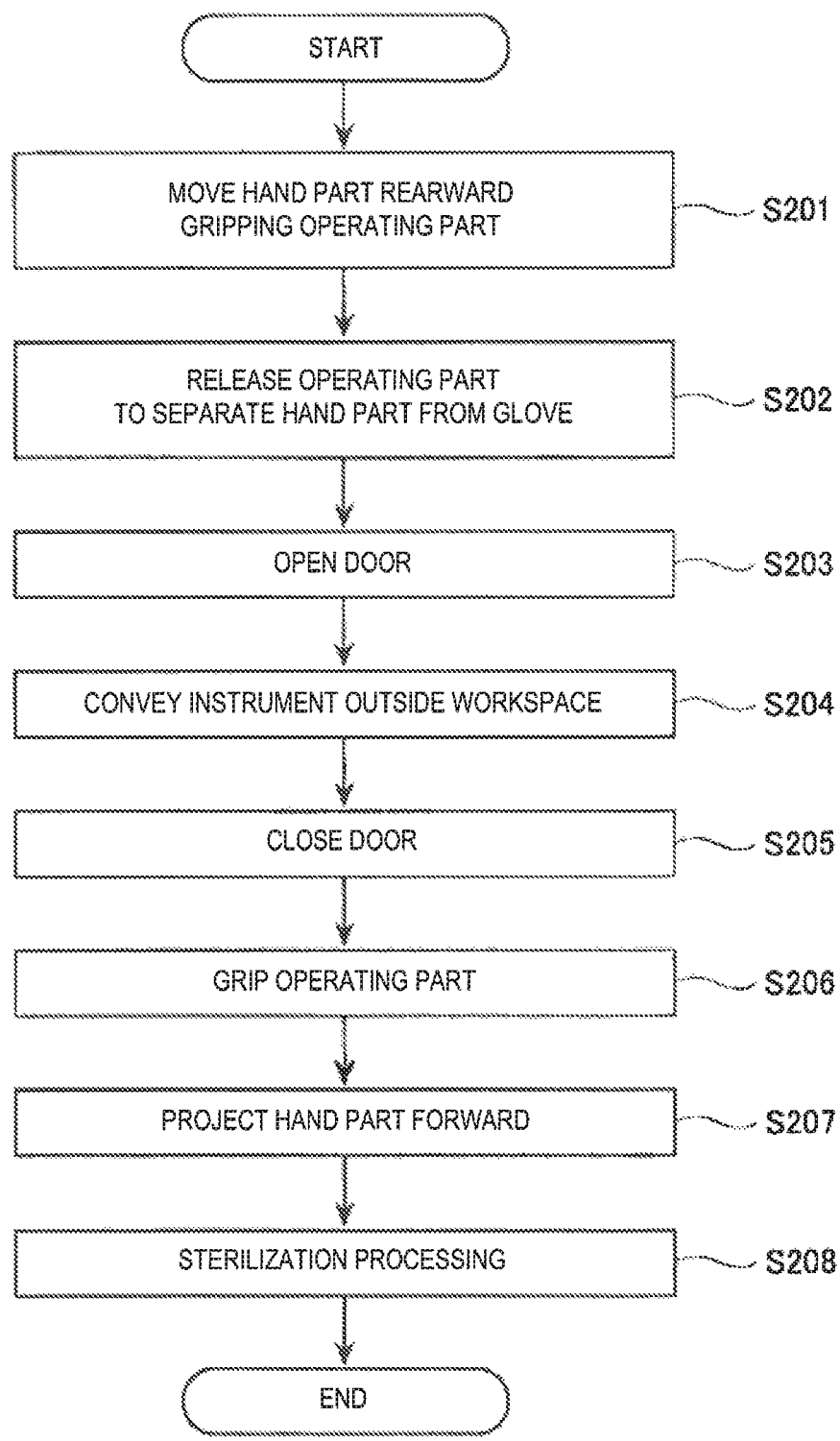
FIG. 7 is a flowchart illustrating one example of a sterilization operation performed after the series of works is executed in the isolator system according to Embodiment 1.

FIG. 7 is a flowchart illustrating one example of the sterilization operation performed after the series of works is executed in the isolator system according to Embodiment 1.

As illustrated in FIG. 7, the control device 10 operates the arm 13 of the robot 101 when it determines that the execution of the series of works are finished, or when the instructive information indicating that the series of works are finished is inputted through the input device (not illustrated) by the operator. For example, the control device 10 operates the arm 13 to move the hand part 118 rearward in the state where the operating part 43 of the glove 140 is gripped by the grip part 19 (Step S201). Next, when the base-end part 41 contracts and the glove 140 moves to the initial position, the control device 10 operates the arm 13 so as to release the gripping of the operating part 43 to separate the hand part 18 from the glove 140 (Step S202).

Next, the control device 10 operates the arm 13 to open the door 122 (Step S203). Next, the control device 10 operates the robot 101 to convey the instrument (e.g., the dish 124) used for the series of works to an appropriate location outside the workspace 120 (Step S204).

Next, the control device 10 operates the arm 13 to close the door 122 (Step S205). Next, the control device 10 operates the arm 13 located outside the workspace 120 so that the hand part 18 enters into the internal space of the base-end part 41 from the through-hole 123 of the door 122, and the grip part 19 grips the operating part 43 of the glove 140 (Step S206).

Next, the control device 10 operates the arm 13 to project the hand part 18 located in the internal space of the base-end part 41 forward (Step S207). Thus, as illustrated in FIG. 5, the base-end part 41 of the glove 140 is in the extended state.

Next, the control device 10 executes the sterilization processing (Step S208), and ends this program.

In the isolator system 100 according to Embodiment 1 configured in this way, since the robot 101 is disposed outside the workspace 120 of the isolator 102, the robot 101 can easily be maintained. Moreover, since the arm 13 of the robot 101 is not exposed to the hydrogen peroxide gas for sterilizing the inside of the workspace 120 by disposing the robot 101 outside the workspace 120, corrosion of the robot 101 can be prevented.

Moreover, in the isolator system 100 according to Embodiment 1, since the base-end part 41 of the glove 140 is formed in the bellows shape, the glove 140 can be prevented from hanging down and the shape of the glove 140 can be maintained. Moreover, since the shape of the glove 140 is maintained, positioning of (the tip-end part of) the glove 140 is easy, and the hand part 18 of the robot 101 can easily advance or retreat into/from the internal space of the base-end part 41. Therefore, when the arm 13 of the robot 101 advances or retreats, contact between the hand part 18 and the base-end part 41 can be prevented, and the breakage of the base-end part 41 can be prevented.

Further, in the isolator system 100 according to Embodiment 1, the sterilization processing is executed in the state where the base-end part 41 of the glove 140 extends. Therefore, since a part of the base-end part 41 is not exposed to the hydrogen peroxide gas, it can be prevented that the sterilization processing becomes insufficient and, thus, the sterilization processing of the glove 140 can fully be carried out. Therefore, contamination by bacteria etc. to the instrument such as the dish 124 can also fully be prevented.

[Modification 1]

Next, one modification of the isolator system 100 according to Embodiment 1 is described.

The isolator system of Modification 1 of Embodiment 1 is disposed inside the glove, and is further provided with a bellows member which can extend and contract.

Below, one example of the isolator system of Modification 1 of Embodiment 1 is described with reference to FIG. 8.

Figure 8:
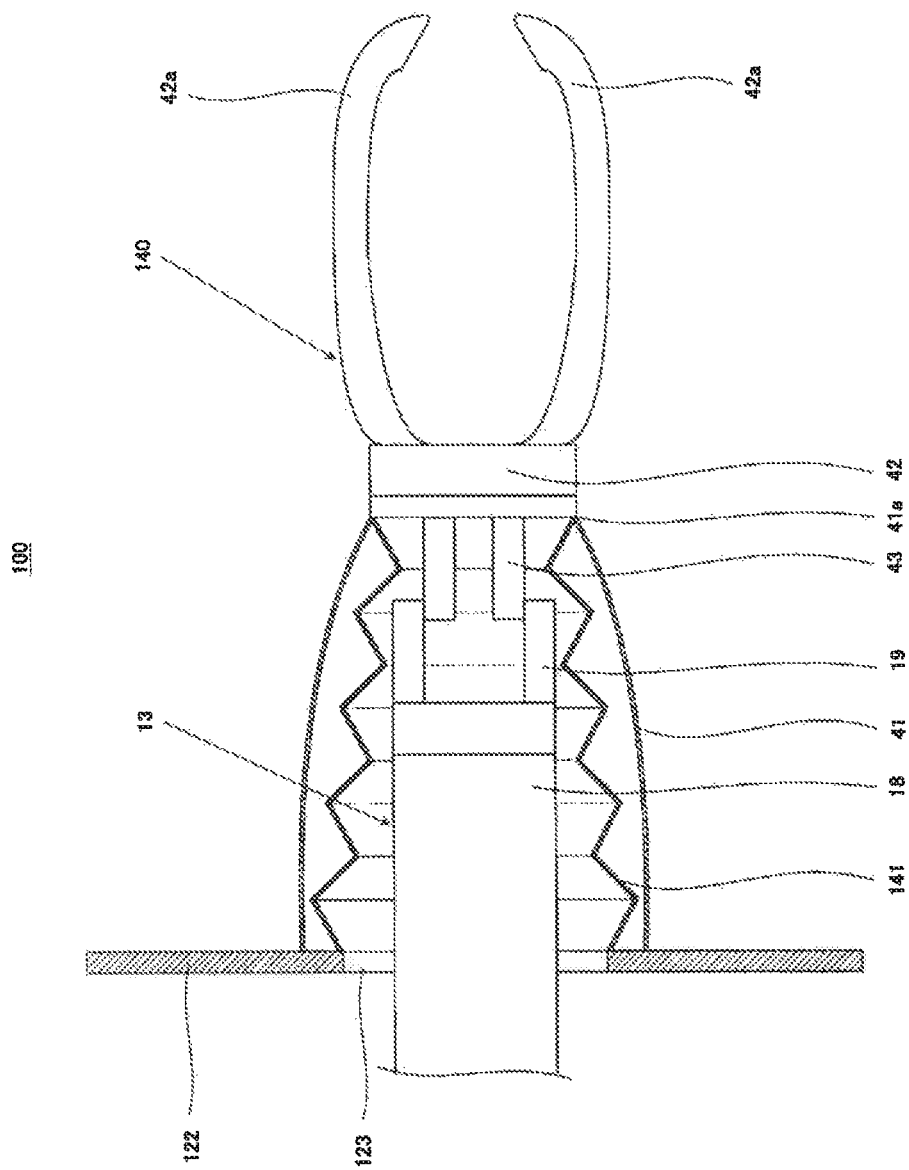
FIG. 8 is an enlarged view schematically illustrating a substantial part of an isolator system of Modification 1 of Embodiment 1.

FIG. 8 is an enlarged view schematically illustrating a substantial part of the isolator system of Modification 1 of Embodiment 1.

As illustrated in FIG. 8, the isolator system 100 of Modification 1 has the same fundamental structure as the isolator system 100 according to Embodiment 1, but differs in the structure of the glove 140. For example, the difference is that the base-end part 41 is formed in a substantially cylindrical shape and a bellows member 141 is disposed in the internal space of the base-end part 41 (inside the glove 140). The bellows member 141 is connected to the internal wall of the door 122 at a base-end part, and is connected to the tip end 41a of the base-end part 41 at a tip-end part. Thus, the base-end part 41 can expand and contract according to the extension and contraction of the bellows member 141.

Moreover, in order to further secure airtightness of the workspace 120, the bellows member 141 may be made of, for example, PVC (polyvinyl chloride), PTFE (polytetrafluoroethylene), PFA (tetrafluoroethylene-perfluoroalkyl vinyl ether copolymer), similar to the base-end part 41.

Note that although in Modification 1 the form in which the base-end part 41 is, but not limited to be, formed in the substantially cylindrical shape is adopted, the base-end part 41 may be formed in a bellows shape similar to Embodiment 1.

Even with the isolator system 100 of Modification 1 configured in this way, similar operation and effects to the isolator system 100 according to Embodiment 1 can be obtained.

[Modification 2]

An isolator system of Modification 2 of Embodiment 1 is disposed inside the glove, and is further provided with a glove holding member having a plurality of rods, and spherical joints which connect the rods. The rods are constructed to be in a telescopic manner.

Below, one example of the isolator system of Modification 2 of Embodiment 1 is described with reference to FIG. 9.

Figure 9:
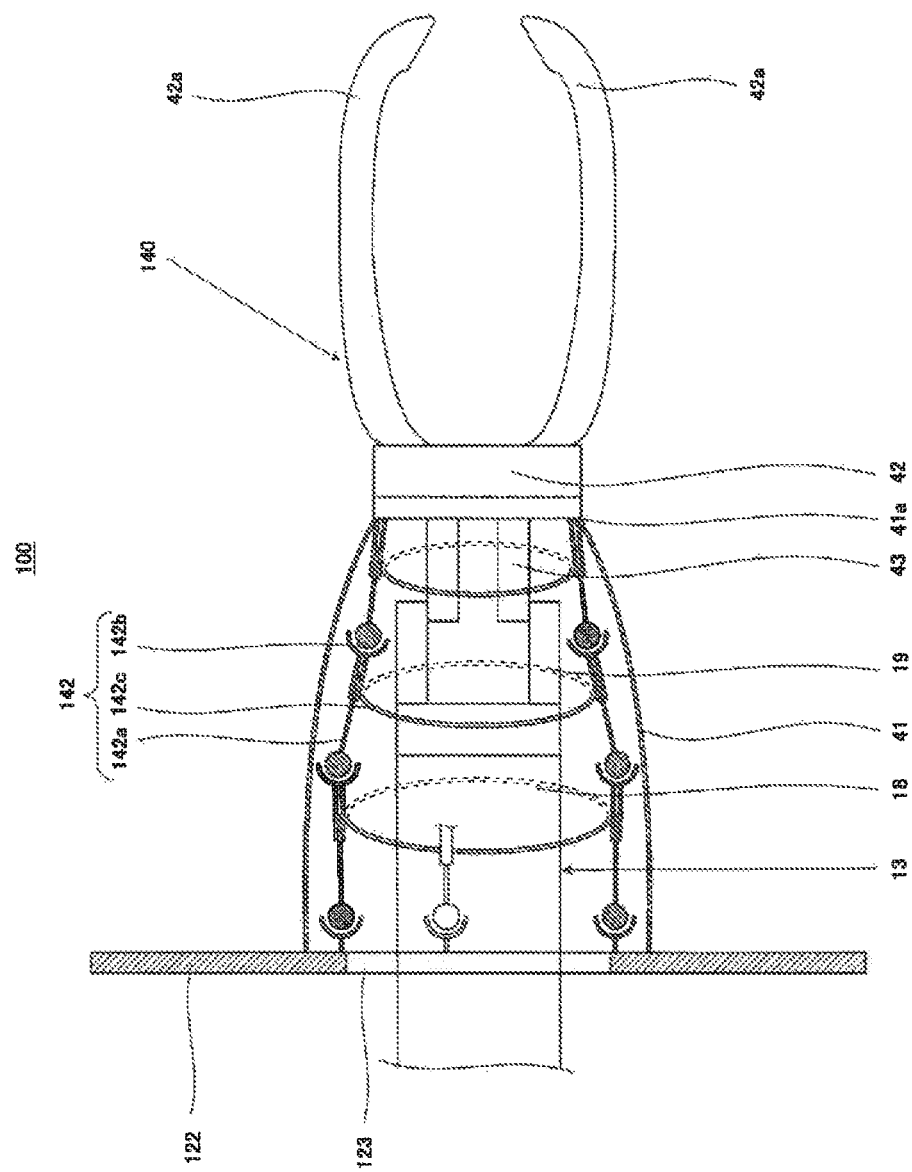
FIG. 9 is an enlarged view schematically illustrating a substantial part of an isolator system of Modification 2 of Embodiment 1.

FIG. 9 is an enlarged view schematically illustrating a substantial part of the isolator system of Modification 2 of Embodiment 1.

As illustrated in FIG. 9, the isolator system 100 of Modification 2 has the same fundamental structure as the isolator system 100 according to Embodiment 1, but differs in the structure of the glove 140. For example, the difference is that the base-end part 41 is formed in a substantially cylindrical shape, and a glove holding member 142 is disposed in the internal space of the base-end part 41.

The glove holding member 142 has a plurality of rods 142*a*, spherical joints 142*b*, and circular-ring-shaped first members 142*c*. A base-end part of the glove holding member 142 is connected to the internal wall of the door 122, and a tip-end part is connected to the tip end 41*a* of the base-end part 41. For example, the spherical joints 142*b* are disposed at the base-end part of the glove holding member 142, and the rods 142*a* are disposed at the tip-end part.

The rods 142*a* are constructed in the telescopic shape, and the adjacent rods 142*a* are connected to each other via the spherical joint 142*b*, in front-and-rear directions of the robot 101. Thus, the glove holding member 142 can freely advance and retreat, and can bend. Therefore, the base-end part 41 of the glove 140 can also advance and retreat, and can bend, following the operation of the glove holding member 142.

Moreover, each first member 142*c* fixes the plurality of rods 142*a* in the up-and-down directions or the left-and-right directions of the robot 101. Thus, the state where the internal space of the base-end part 41 spreads can be maintained, and the glove 140 can be prevented from hanging down.

Note that although in Modification 2 the form in which the first member 142*c* is, but not limited to be, formed in the circular ring shape is adopted, the first member 142*c* may be formed in a polygonal shape.

Even with the isolator system 100 of Modification 2 configured in this way, similar operation and effects to the isolator system 100 according to Embodiment 1 can be obtained.

Embodiment 2

The isolator system according to Embodiment 2 includes the workspace isolated from the exterior space by a partition, a glove provided to the partition so that the external surface thereof is exposed to the workspace and the internal surface thereof communicates with the exterior space, and the robot which inserts the arm into the glove and performs the work inside the workspace. The tip-end part of the glove is formed corresponding to the shape of the arm tip-end part of the robot.

Moreover, in the isolator system according to Embodiment 2, the glove may be configured so that the tip-end part thereof is positioned at a given position when the base-end part contracts.

Below, one example of the isolator system according to Embodiment 2 is described in detail with reference to FIGS. 10 to 12.

[Structure of Isolator System]

Figure 10:
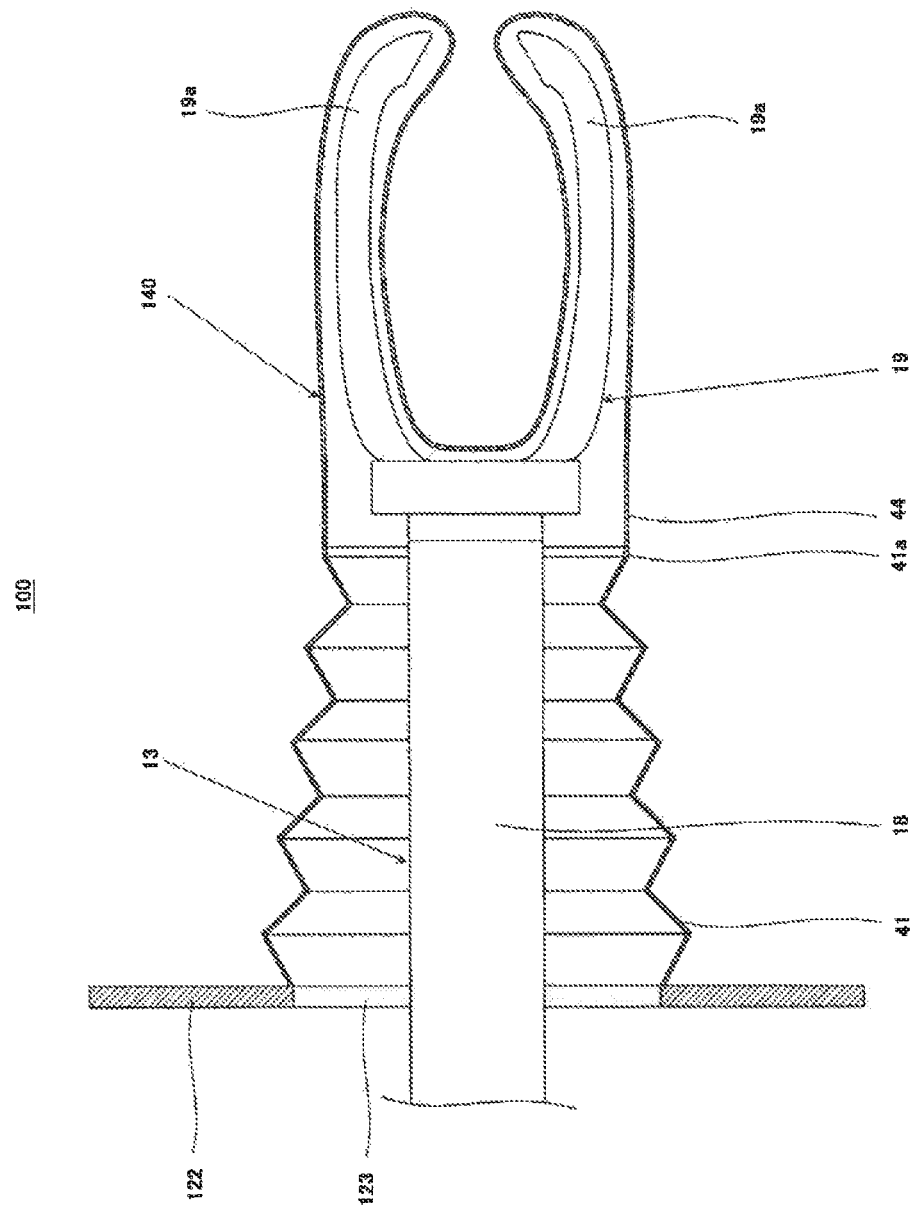
FIG. 10 is an enlarged view schematically illustrating a substantial part of an isolator system according to Embodiment 2.

FIG. 10 is an enlarged view schematically illustrating a substantial part of an isolator system according to Embodiment 2.

As illustrated in FIG. 10, although the isolator system 100 according to Embodiment 2 has the same fundamental structure as the isolator system 100 according to Embodiment 1, but differs in the shape of the grip part 19 of the robot 101 and the shape of the tip-end part 44 of the glove 140.

For example, the grip part 19 has a pair of pawl parts 19*a* for gripping the workpiece, and the inside surface of each pawl part 19*a* is formed in an arc shape. Thus, the disk-shaped dish 124 or the cylindrical auto pipette 125 can easily be gripped.

Note that although in Embodiment 2 the form in which the inside surface of the pawl part 19*a* is formed in the arc shape is adopted, the present disclosure is not limited to this structure. For example, the inside surface of the pawl part 19*a* may be formed in a flat plate shape. In this case, a contacting area with the workpiece, such as the dish 124, can be increased by disposing an elastic member on the inside surface of the pawl part 19*a*.

Moreover, the tip-end part 44 of the glove 140 is formed corresponding to the shape of the grip part 19 which is the tip-end part of the arm 13. That is, the tip-end part 44 is constructed to substantially conform with the shape of the grip part 19 (to have an equivalent shape) so that the grip part 19 can easily advance and retreat inside the tip-end part 44. More specifically, in Embodiment 2, the tip-end part 44 of the glove 140 is entirely formed in a substantially U-shape in the cross section, and is formed so as to wrap the grip part 19.

Note that in Embodiment 2 the form in which the tip-end part 44 of the glove 140 has a gap between the internal surface of the tip-end part 44 the external surface of the grip part 19 is adopted. However, the present disclosure is not limited to this structure, and the gap may not be formed between the internal surface of the tip-end part 44 and the external surface of the grip part 19.

[Operation and Effects of Isolator System]

Next, operation and effects of the isolator system 100 according to Embodiment 2 are described with reference to FIGS. 10 to 12. Note that, since the operation of the robot 101 when the robot 101 performs the series of works comprised of the plurality of processes is performed similarly to the known robots, the detailed description of the operation is omitted. The following operation is executed by the processor 10*a* of the control device 4 reading the program stored in the memory 10*b*.

First, a sterilization operation performed by the robot 101 before executing the series of works comprised of the plurality of processes is described with reference to FIGS. 10 and 11.

Figure 11:
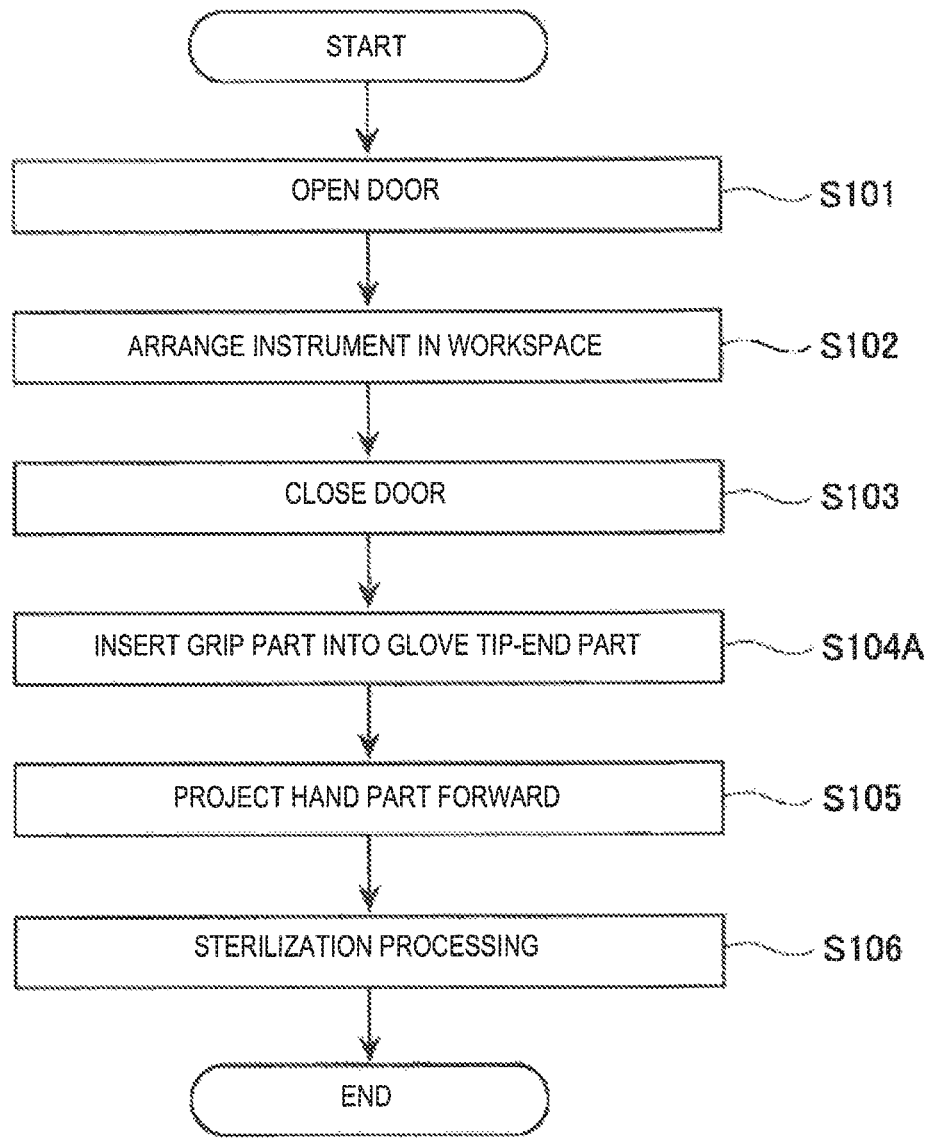
FIG. 11 is a flowchart illustrating one example of a sterilization operation performed before executing the series of works in the isolator system according to Embodiment 2.

FIG. 11 is a flowchart illustrating one example of the sterilization operation performed before executing the series of works in the isolator system according to Embodiment 2.

As illustrated in FIG. 11, although the sterilization operation performed before executing the series of works in the isolator system 100 according to Embodiment 2 is fundamentally the same as the sterilization operation performed before executing the series of works in the isolator system 100 according to Embodiment 1, it differs in that operation of Step S104A is executed, instead of the operation of Step S104.

For example, the control device 10 operates the arm 13 of the robot 101 located outside the workspace 120 to cause the hand part 18 to enter into the internal space of the base-end part 41 of the glove 140 from the through-hole 123 of the door 122. Then, the control device 10 operates the arm 13 until the grip part 19 of the arm 13 reaches the internal space of the tip-end part 44 of the glove 140 (Step S104A). Here, since the tip-end part 44 of the glove 140 is formed corresponding to the shape of the grip part 19, the grip part 19 can easily advance into the internal space of the tip-end part 44.

Then, the control device 10 executes sterilization operation by executing Steps S105 and S106, similar to the isolator system 100 according to Embodiment 1.

Next, a sterilization operation performed after the robot 101 executed the series of works comprised of the plurality of processes is described with reference to FIGS. 10 and 12.

Figure 12:
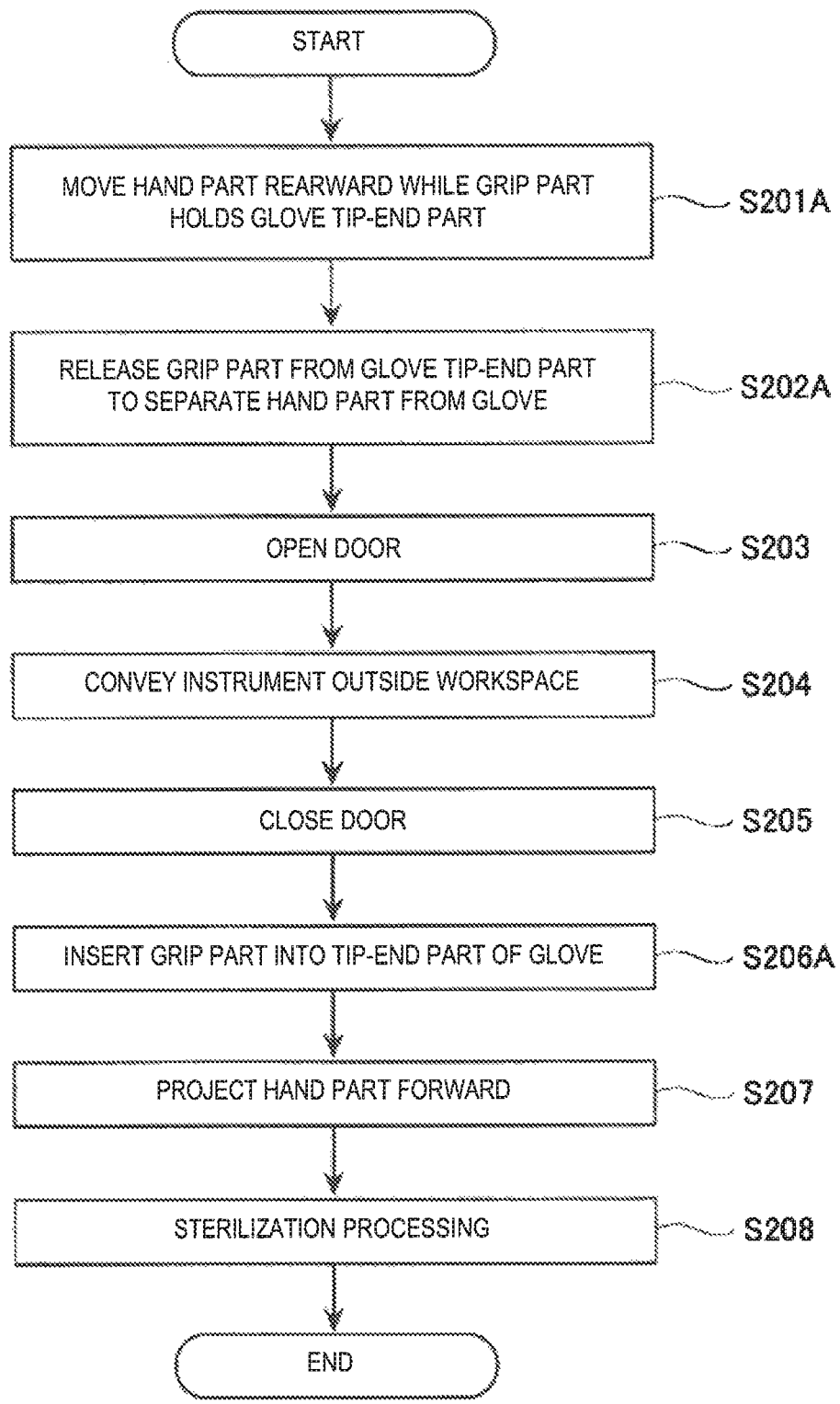
FIG. 12 is a flowchart illustrating one example of a sterilization operation performed after the series of works is executed in the isolator system according to Embodiment 1.

FIG. 12 is a flowchart illustrating one example of the sterilization operation performed after the series of works is executed in the isolator system according to Embodiment 1.

As illustrated in FIG. 12, the control device 10 closes the pawl parts 19a of the grip part 19, and in a state where the grip part 19 is holding the tip-end part 44 of the glove 140, and operates the arm 13 so that the hand part 18 moves rearward (Step S201A). Next, when the base-end part 41 contracts and the glove 140 moves to the initial position, the control device 10 opens the pawl parts 19a of the grip part 19 to release the grip part 19 from the tip-end part 44, and operates the arm 13 so that the hand part 18 separates from the glove 140 (Step S202A).

Next, the control device 10 operates the arm 13 to open the door 122 (Step S203). Next, the control device 10 operates the robot 101 to convey the instrument (e.g., the dish 124) used for the series of works to the appropriate location outside the workspace 120 (Step S204).

Next, the control device 10 operates the arm 13 to close the door 122 (Step S205). Next, the control device 10 operates the arm 13 located outside the workspace 120 to cause the hand part 18 to enter into the internal space of the base-end part 41 of the glove 140 from the through-hole 123 of the door 122. Then, the control device 10 operates the arm 13 until the grip part 19 of the arm 13 reaches the internal space of the tip-end part 44 of the glove 140 (Step S206A).

Next, the control device 10 operates the arm 13 to project the hand part 18 located in the internal space of the base-end part 41 forward (Step S207). Thus, as illustrated in FIG. 5, the base-end part 41 of the glove 140 becomes in the extended state.

Next, the control device 10 executes the sterilization processing (Step S208), and ends this program.

Even with the isolator system 100 according to Embodiment 2 configured in this way, similar operation and effects to the isolator system 100 according to Embodiment 1 can be obtained.

[Modification 1]

Next, one modification of the isolator system according to Embodiment 2 is described.

The isolator system of Modification 1 of Embodiment 2 is disposed inside the glove, and is further provided with a bellows member which can extend and contract.

Below, one example of the isolator system of Modification 1 of Embodiment 2 is described with reference to FIG. 13.

Figure 13:
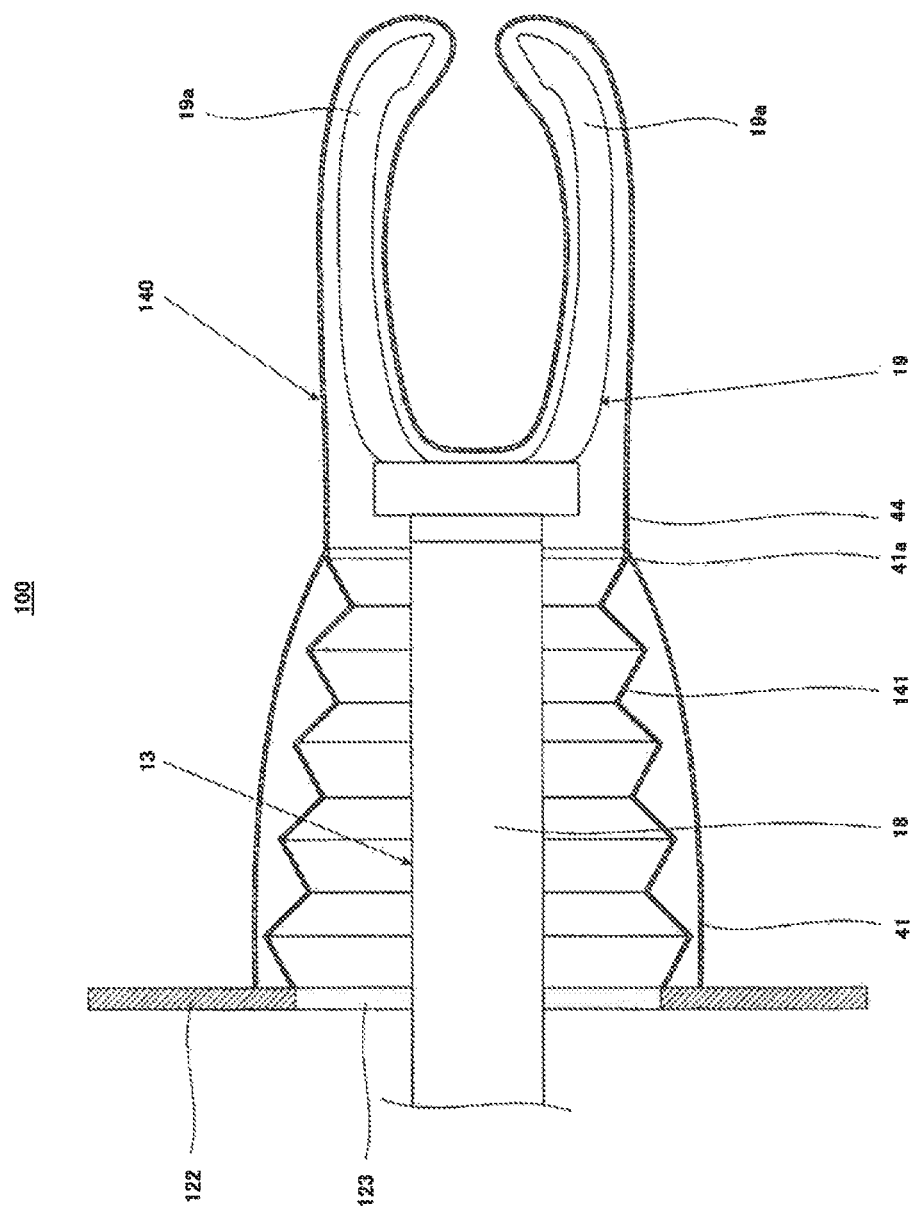
FIG. 13 is an enlarged view schematically illustrating a substantial part of an isolator system of Modification 1 of Embodiment 2.

FIG. 13 is an enlarged view schematically illustrating a substantial part of the isolator system of Modification 1 of Embodiment 2.

As illustrated in FIG. 13, the isolator system 100 of Modification 1 has a fundamentally the same structure as the isolator system 100 according to Embodiment 2, but differs in the structure of the glove 140. For example, the difference is that the base-end part 41 is formed in a substantially cylindrical shape, and a bellows member 141 is disposed in the internal space of the base-end part 41. The bellows member 141 is connected at a base-end part to the internal wall of the door 122, and is connected at a tip-end part to the tip end 41a of the base-end part 41. Thus, the base-end part 41 can extend and contract according to the extension and contraction of the bellows member 141.

Moreover, in order to further secure the airtightness of the workspace 120, the bellows member 141 may be made of, for example, PVC (polyvinyl chloride), PTFE (polytetrafluoroethylene), PFA (tetrafluoroethylene-perfluoroalkyl vinyl ether copolymer), similar to the base-end part 41.

Note that although in Modification 1 the form in which the base-end part 41 is, but not limited to be, formed in the substantially cylindrical shape is adopted, the base-end part 41 may be formed in a bellows shape, similar to Embodiment 2.

Even with the isolator system 100 of Modification 1 configured in this way, similar operation and effects to the isolator system 100 according to Embodiment 2 can be obtained.

Embodiment 3

An isolator system according to Embodiment 3 having the structure of the isolator system according to Embodiment 1 or Embodiment 2 is further provided with a hand which is disposed in the workspace of an isolator and holds the workpiece.

Below, one example of the isolator system according to Embodiment 3 is described with reference to FIG. 14.

Figure 14:
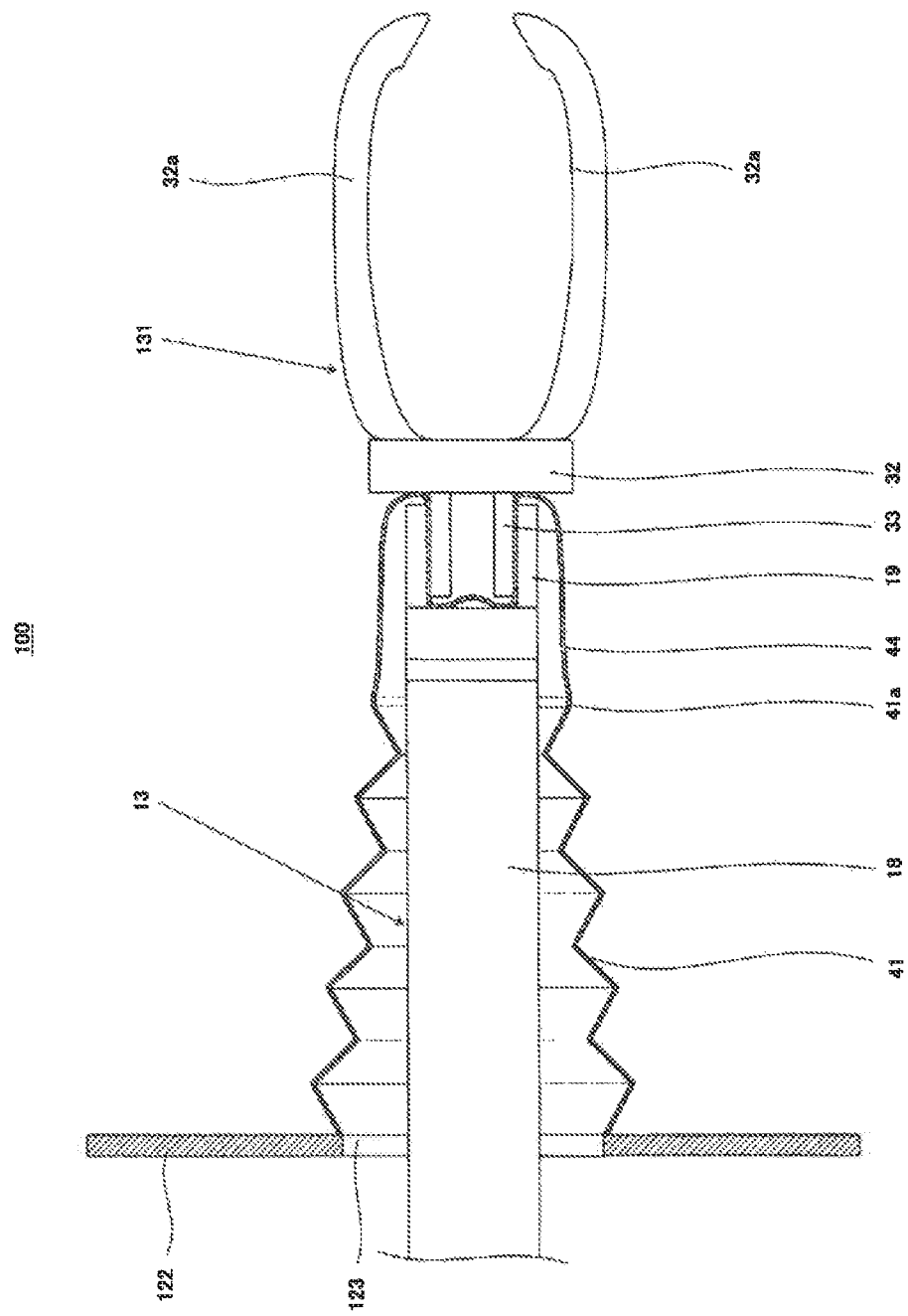
FIG. 14 is an enlarged view schematically illustrating a substantial part of an isolator system according to Embodiment 3.

FIG. 14 is an enlarged view schematically illustrating a substantial part of the isolator system according to Embodiment 3.

As illustrated in FIG. 14, the isolator system 100 according to Embodiment 3 has fundamentally the same structure as the isolator system 100 according to Embodiment 2, but differs in the shape of the grip part 19 of the robot 101, and a hand 131 being disposed in the workspace 120. Note that, in the workspace 120, one type of hand 131 which can handle every instruments disposed in the workspace 120 may be disposed, or a plurality of types of hands 131 which handle the respective instruments may be disposed.

In the grip part 19 of the robot 101, pawl parts 19a are each formed in a flat plate shape. That is, the grip part 19 of the robot 101 in the isolator system 100 according to Embodiment 3 has a similar structure to the grip part 19 of the robot 101 in the isolator system 100 according to Embodiment 1.

Moreover, the hand 131 has a hand part 32 and an operating part 33. The hand part 32 is provided with pawl parts 32a which grips the workpiece. An inside surface of each pawl part 32*a* is formed in an arc shape. Thus, the disk-shaped dish 124 or the cylindrical auto pipette 125 can easily be gripped.

Note that although in Embodiment 3 the form in which the inside surface of the pawl part 32*a* is formed in the arc shape is adopted, the present disclosure is not limited to this structure. For example, the inside surface of the pawl part 32*a* may be formed in a flat plate shape. In this case, a contacting area with the workpiece, such as the dish 124, can be increased by disposing an elastic member on the inside surface of the pawl part 32*a*.

Moreover, the operating part 33 is configured to operate the pawl parts 32*a* of the hand part 32 by the grip part 19 of the arm 13 of the robot 101 gripping the operating part 33. Note that the operating part 33 may be configured to physically operate the pawl part 32*a*, or may be configured to operate the pawl parts 32*a* by being electrically connected with the grip part 19.

Even with the isolator system 100 according to Embodiment 3 configured in this way, similar operation and effects to the isolator system 100 according to Embodiment 2 can be obtained.

[Modification 1]

Next, one modification of the isolator system according to Embodiment 3 is described.

The isolator system of Modification 1 of Embodiment 3 is disposed inside the glove, and is further provided with a bellows member which can extend and contract.

Hereinafter, one example of the isolator system of Modification 1 of Embodiment 3 is described with reference to FIG. 15.

Figure 15:
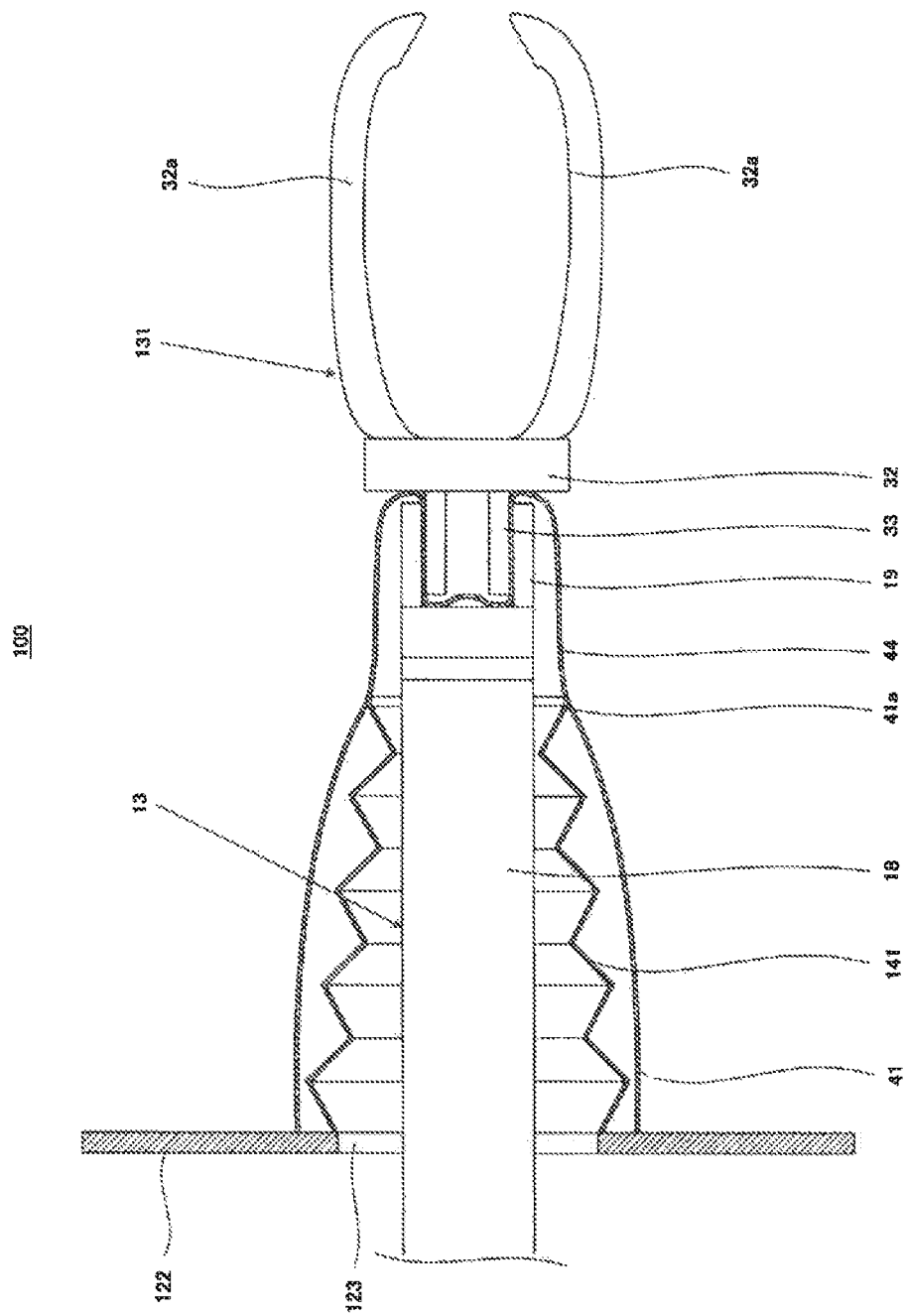
FIG. 15 is an enlarged view schematically illustrating a substantial part of an isolator system of Modification 1 of Embodiment 3.

FIG. 15 is an enlarged view schematically illustrating a substantial part of the isolator system of Modification 1 of Embodiment 3.

As illustrated in FIG. 15, the isolator system 100 of Modification 1 has fundamentally the same structure as the isolator system 100 according to Embodiment 3, but differs in the structure of the glove 140. For example, the difference is that the base-end part 41 is formed in a substantially cylindrical shape, and a bellows member 141 is disposed in the internal space of the base-end part 41. The bellows member 141 is connected at a base-end part to the internal wall of the door 122, and is connected at a tip-end part to the tip end 41*a* of the base-end part 41. Thus, the base-end part 41 can extend and contract according to the extension and contraction of the bellows member 141.

Moreover, in order to further secure the airtightness of the workspace 120, the bellows member 141 may be made of, for example, PVC (polyvinyl chloride), PTFE (polytetrafluoroethylene), PFA (tetrafluoroethylene-perfluoroalkyl vinyl ether copolymer), similar to the base-end part 41.

Note that although in Modification 1 the form in which the base-end part 41 is, but not limited to be, formed in the substantially cylindrical shape is adopted, the base-end part 41 may be formed in a bellows shape, similar to Embodiment 3.

Even with the isolator system 100 of Modification 1 configured in this way, similar operation and effects to the isolator system 100 according to Embodiment 3 can be obtained.

It is apparent for a person skilled in the art the many improvements or other embodiments of the present disclosure may be possible from the above description. Therefore, the above description is to be interpreted only as illustration, and it is provided in order to teach a person skilled in the art the best mode that implements the present disclosure. The details of the structures and/or the functions may substantially be changed, without departing from the spirit of the present disclosure.

INDUSTRIAL APPLICABILITY

Since the isolator system of the present disclosure enables an easy maintenance of the robot which performs the work in the internal space of the isolator, it is useful in the field of industrial robots.

DESCRIPTION OF REFERENCE CHARACTERS

10 Control Device
10*a* Processor
10*b* Memory
10*c* Servo Controller
12 Carriage
12*a* Wheel
13 Arm
15 Arm Part
15*a* First Link
15*b* Second Link
16 Base Shaft
17 Wrist Part
18 Hand Part
18*a* Attachment Part
19 Grip Part
19*a* Pawl Part
32 Hand Part
32*a* Pawl Part
33 Operating Part
41 Base-end Part
41*a* Tip End
42 Hand Part
42*a* Pawl Part
43 Operating Part
44 Tip-end Part
100 Isolator System
101 Robot
102 Isolator
120 Workspace
121 Case
122 Door
123 Through-Hole
124 Dish
125 Auto Pipette
126 Chip
127 Micro Tube
128 Centrifuge Tube
129 Centrifugal-Separator
130 Camera
131 Hand
140 Glove
141 Bellows Member
142 Glove Holding Member
142*a* Rod
142*b* Spherical Joint
142*c* First Member

The invention claimed is:

1. An isolator system comprising:
a robot;
a workspace isolated from an exterior space by a case having a partition,
the case being configured with a first through hole and a second through hole on the partition; and a first glove and a second glove provided to the first through hole and second through hole, respectively, so that an external surface of each glove is exposed to the workspace and an internal surface of each glove communicates with the exterior space, wherein each of the first glove and the second glove includes:
   an operating part provided inside each of the first glove and the second glove at a tip-end of each glove, the operating part being configured to be gripped by an arm of the robot within the internal surface of each glove, and
   a hand part located outside of each glove and exposed to the workspace, the hand part being connected to the operating part at the tip-end of each glove, the hand part including a plurality of pawls configured to grip a workpiece, and the operating part is configured to be manipulated by a grip part of the robot to operate the plurality of pawls of the hand part when the grip part of the arm of the robot grips the operating part within the internal surface of each glove, the arm includes a first arm and a second arm, and the robot is configured to insert the first arm into the first glove and the second arm into the second glove, and performs a work process in the workspace.

2. The isolator system of claim 1, wherein when a base-end of each glove contracts, the tip-end of each glove is positioned at a given position.

3. The isolator system of claim 1, wherein a base-end of each glove is formed in a bellows shape that is extendable and contractible.

4. The isolator system of claim 1, further comprising a glove holding member disposed inside each glove and having a plurality of rods and spherical joints connecting the plurality of rods, each rod of the plurality of rods being formed in a telescopic manner.

5. The isolator system of claim 1, further comprising a hand disposed in the workspace of an isolator and configured to hold the workpiece.

6. The isolator system of claim 1, further comprising a bellows member disposed inside each glove and configured to be extendable and contractible.

7. The isolator system of claim 1, wherein each of the first arm and the second arm is a horizontal articulated robot arm.

8. An isolator system comprising:

a workspace isolated from an exterior space by a case having a partition, the case being configured with a first through hole and a second through hole on the partition; and a first glove and a second glove provided to the first through hole and second through hole, respectively, so that an external surface of each glove is exposed to the workspace and an internal surface of each glove communicates with the exterior space, wherein each of the first glove and the second glove includes:
   an operating part provided inside each of the first glove and the second glove at a tip-end of each glove, the operating part being configured to be gripped by an arm of a robot within the internal surface of each glove, and
   a hand part located outside the internal surface of each glove and exposed to the workspace, the hand part being connected to the operating part at the tip-end of each glove, the hand part including a plurality of pawls configured to grip a workpiece, and the operating part is configured to be manipulated by a grip part of the robot to operate the plurality of pawls of the hand part when the grip part of the arm of the robot grips the operating part within the internal surface of each glove, the arm includes a first arm and a second arm, and the robot inserts the first arm into the first glove and the second arm into the second glove, and performs a work process in the workspace.

\* \* \* \* \*